May 2, 1961 T. P. FARKAS 2,982,258
PRESSURE RATIO DEVICE UTILIZING A FREE PISTON VALVE FOR PRESSURE
RATIO REGULATION AND A SERVO MECHANISM COACTING THEREWITH TO
AMPLIFY PRESSURE RATIO ERROR CORRECTION
Filed June 4, 1957
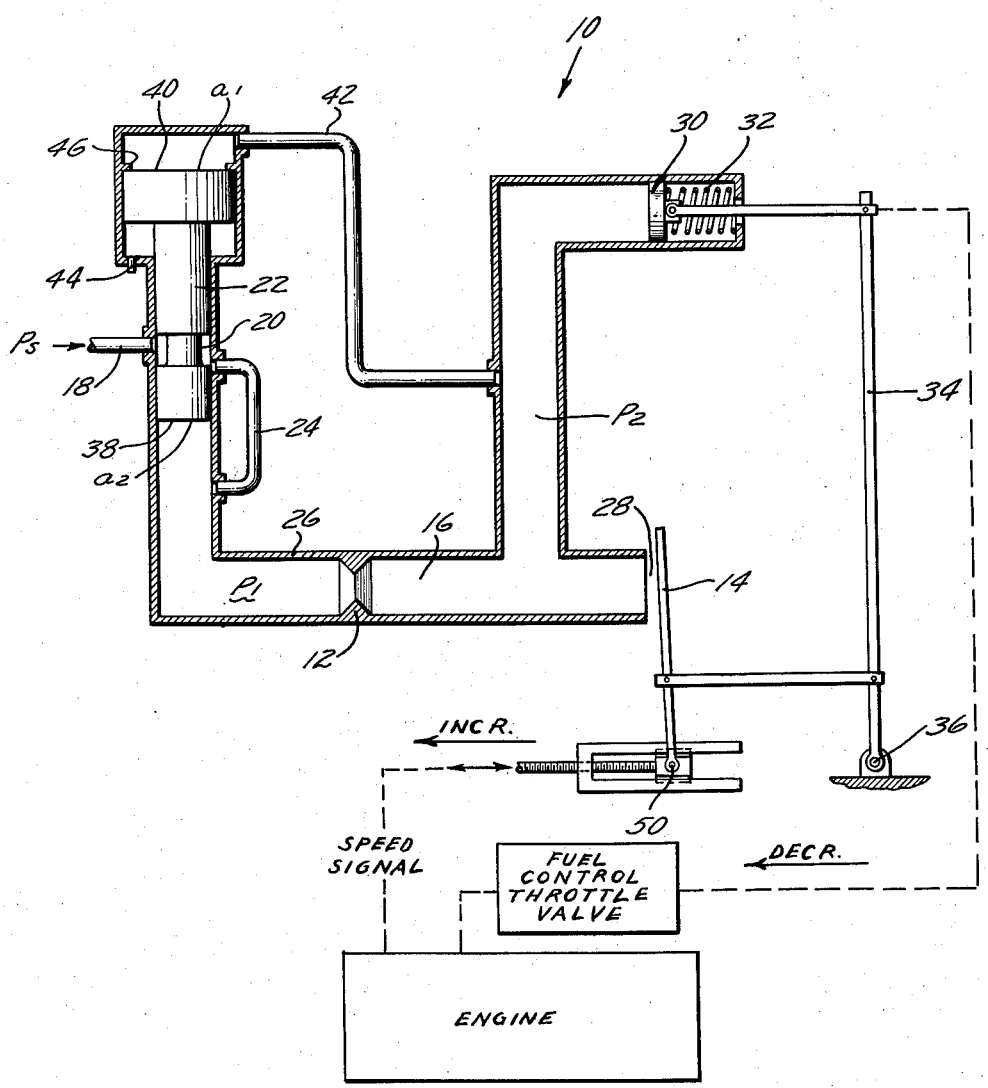
INVENTOR
THOMAS P. FARKAS
BY Vernon F. Hauschild
ATTORNEY United States Patent Office 2,982,258
Patented May 2, 1961

2,982,258

PRESSURE RATIO DEVICE UTILIZING A FREE PISTON VALVE FOR PRESSURE RATIO REGULATION AND A SERVO MECHANISM COACTING THEREWITH TO AMPLIFY PRESSURE RATIO ERROR CORRECTION

Thomas P. Farkas, Bloomfield, Conn., assignor to United Aircraft Corporation, East Hartford, Conn., a corporation of Delaware Filed June 4, 1957, Ser. No. 663,399

10 Claims. (Cl. 121—41)

This invention relates to a pressure ratio regulator and more particularly to a pressure regulating system utilizing a servo actuated variable area valve and having a free floating piston that performs the function of aiding system sensitivity by effecting drastic servo actuating pressure changes in response to pressure ratio deviations caused by variable area valve movements.

It is an object of this invention to teach a pressure ratio regulating system utilizing a flow passage with two restrictions therein, one of which is variable and servo actuated and utilizing a free floating piston flow regulating valve upstream of the orifices to effect drastic servo actuating pressure changes in response to variable area valve movement to maintain the variable area valve at a fixed area for all steady state flow conditions without respect to variations in supply pressure and servo actuator load variations and to further maintain the fluid pressure upstream and between the two restrictions and the servo spring force constant for each particular steady state flow condition.

It is a further object of this invention to provide a pressure ratio regulating system in which the pressure ratio is established as a function of the end surface area ratio existing in a floating piston type flow regulator valve.

These and other objects of this invention will become readily apparent from the following detailed description of the drawing in which:

The sole drawing is a schematic illustration of my pressure ratio regulator.

While not necessarily so limited, my pressure ratio regulator may be used as shown in the drawing to receive an input signal, such as a speed signal, from an engine and to provide a corrective output signal to the throttle valve of a fuel control of the type fully described in U.S. application Serial No. 611,338, now Pat. No. 2,926,494, which provides fuel to and hence controls the speed of the engine. In the past, when a system of this type was used without my pressure ratio regulator, the output signal to the fuel control throttle valve, which should reflect changes in input signal only, would erroneously reflect changes due to variations in supply pressure $P_s$, thereby repositioning the variable area valve without an input signal change. My invention overcomes this problem by causing the variable area valve to be of a fixed area for all steady state flow conditions and by maintaining the pressure upstream of the two orifices, $P_1$, and the pressure between the two orifices, $P_2$, as well as the servo spring force $F_{32}$, constant for each particular steady state flow condition. By accomplishing these functions in a manner to be described in greater particularity hereinafter, the system disclosed herein provides the advantages that: (1) the output signal is unaffected by variations in supplying pressure $P_s$, (2) the output signal is unaffected by variations in the load upon the output mechanism, for instance, variations in the load on the fuel control throttle valve and (3) a high sensitivity system is attained wherein the various parameters described supra and including the pressure ratio $P_2/P_1$ and the variable area valve area, $A_{28}$, are returned to their fixed steady state values rapidly to correct system errors.

The drawing shows pressure ratio regulator unit 10 which comprises fixed, and possibly adjustable, area orifice 12 and variable area valve 14, which may be of the flapper type, as shown, combining to form a double restriction in flow passage 16. Fluid enters flow passage 16 through line 18 to which it is provided by any convenient source such as a pump at supply pressure $P_s$. Upon leaving line 18, the fluid will pass through groove or orifice 20, located in flow regulating valve 22, which is a free floating and unbiased piston and thence through line 24 into passage defining duct 26. The flow of fluid through passage 16 establishes a reference pressure $P_1$ between flow regulator valve 22 and fixed area orifice 12 and a second reference pressure $P_2$ between fixed area orifice 12 and variable area orifice 28, formed between duct 26 and valve 14.

Regulator valve 22 is an unbiased free floating piston and has end surface 38 which communicates with reference pressure $P_1$ and has end surface 40 which communicates through line 42 with reference pressure $P_2$. Drain 44 is provided to the system. During steady state flow through passage 16, the area of variable area orifice 28 will be proportional to the area of fixed orifice 12, and the position of regulating valve 22 will be determined by the force exerted on end surface 38 by the pressure $P_1$ and the force exerted on end surface 40 by pressure $P_2$. A pressure ratio may be established between reference pressures $P_1$ and $P_2$ which is proportional to the area ratio between end surfaces 40 and 38 of free floating piston 22 for a steady state flow condition through gas passage 16.

Let us assume that end surface 40 is area $a_1$ while end surface 38 is area $a_2$ and that area $a_1$ equals two times area $a_2$. Therefore, for steady state conditions of flow regulating valve 22, reference pressure $P_2$ will be half reference pressure $P_1$ since $P_2a_1=P_1a_2$. By utilizing the formula of flow equals orifice area times the square root of the pressure drop across the orifice, we can show that for steady state flow operation through flow passage 16 the area of orifice 12 will equal the area of orifice 28 as follows, since the flow through each orifice will be equal:

$$A_{12}\sqrt{P_1-P_2}=A_{28}\sqrt{P_2}$$
$$A_{12}\sqrt{2P_2-P_2}=A_{28}\sqrt{P_2}$$
$$A_{12}=A_{28}$$

From the above calculation it will be seen that the area ($A_{28}$) of the variable area valve 14 is constant for all steady state conditions. By further manipulating the formulas given in the preceding paragraph, it may be shown that:

$$\frac{P_2}{P_1}=\frac{(A_{12})^2}{(A_{28})^2+(A_{12})^2}=\frac{a_2}{a_1}$$

From this it will be seen that during steady state flow operations, (1) $A_{28}$ is constant, (2) the force of the servo spring, $F_{32}$, is constant because it is affected by the input signal to pivot point 50 and variations in the variable area valve area $A_{28}$ only and since each of these is constant during a steady state flow operation, $F_{32}$ must also be constant, (3) $P_2$ is constant in view of the force equation acting across servo piston 30, $P_2A_{30}=F_{32}$, $F_{32}$ and $A_{30}$ being constant and (4) $P_1$ is constant since $P_2$ did not change. In view of the above-stated conditions, our pressure ratio regulator provides a system having the advantage of an output signal unaffected by variations in either supply pressure $P_s$ or output mechanism load. If the pressure ratio regulator were to be removed from the disclosed system so that $P_1$ is $P_s$, it can be shown by equating the flow formulas of area times the square root of pressure drop across orifices 12 and 28 that $P_2$ varies with fluctuations in $P_s$. By utilizing the force balance formula on servo piston 30 discussed supra, it can be shown that changes in $P_s$ cause changes in the force of servo spring, $F_{32}$, thereby varying the system output.

Flow regulating valve 22 will perform the function of repositioning itself to control the admission of high pressure fluid $P_s$ to passage 16, thereby re-establishing the desired pressure ratio between reference pressures $P_1$ and $P_2$ such that they are maintained constant and proportionate to areas $a_1$ and $a_2$ of free floating piston 22 during steady state flow operation.

The utilization of the pressure ratio regulating system taught herein accomplishes more than would be accomplished by merely regulating pressure $P_s$ or $P_1$. If pressure regulating means were used, it would be necessary to calibrate or select the pressure regulator to be accurate at the low end of its operating range and it would therefore lack the essential sensitivity at the all-important high end of its range, whereas the use of the pressure ratio regulator gives good pressure control over a large range of pressure fluctuation. Further, the use of a pressure regulator would not provide the advantage of a system wherein the output is unaffected by the loads imposed thereon.

With respect to the error sensitivity and the amplified or accelerated error correction advantage mentioned supra, it will be noted that reference pressure $P_2$ acts upon servo piston 30 in opposition to spring 32 to cause link 34 to pivot about pivot point 36 and thereby vary the position of valve 14 and hence the area of orifice 28 and send an output signal to the fuel control throttle valve. Therefore, when steady state flow is interrupted by movement of valve 14, regulator valve 22 will serve to provide maximum reference pressure $P_2$ change to servo unit 30, thereby accelerating the servo repositioning of valve 14 to re-establish steady state flow and the desired pressure ratio. Let us assume that valve 14 moves so as to increase orifice 28, this will decrease reference pressure $P_2$ and thereby cause piston 22 to move upwardly to its end travel position against stop 46, thereby reducing the admission of high pressure source $P_s$ so that reference pressure $P_2$ is immediately drastically reduced to some low value so that spring 32 may quickly move servo piston 30 to the left, thereby closing valve 14 and reducing the size of variable area restriction 28 to re-establish steady state flow and the desired pressure ratio between reference pressures $P_2$ and $P_1$.

Now let us assume that valve 14 closes to reduce the area of variable area restriction 28. This will increase reference pressure $P_2$ to force free piston 22 to its opposite end travel position which will also be its full open position, so that high pressure source $P_s$ will be admitted freely into passage 16, thereby greatly increasing pressure $P_2$ to accelerate servo correction by forcing servo piston 30 rapidly to the right to increase the area of restriction 28 to re-establish steady state flow and the desired pressure ratio between reference pressures $P_2$ and $P_1$.

In this fashion it will be noted that free piston 22 performs the function of regulating the flow of high pressure source $P_s$ into gas passage 16 during steady state flow and the further function of accelerating servo correction of the position of variable area valve 14 to re-establish the steady state flow and hence the desired pressure ratio.

It will be obvious to those skilled in the art that both orifices 12 and 28 may be variable area and controlled by the mechanism which positions 14 in the drawing of this application.

It will further be obvious that adjustable pivot 50 of valve 14 could be control actuated to indicate any sensed error, which error will be corrected by servo 30 in a fashion not limited to the illustration shown. These and other uses will be envisioned by those skilled in the art to utilize the servo device 10 taught herein.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. A servo device comprising a flow passage with two orifices of variable total area therein, means to pass fluid through said passage to establish a first reference pressure upstream of said orifices and a second reference pressure between said orifices, a servo unit actuated by said second reference pressure and adapted to vary the total area of said orifices, and a valve communicating with said first and second reference pressure and having preselected end areas to establish the desired ratio between said reference pressures and communicating with and controlling the admission of a high pressure source into said passage for added sensitivity.

2. A servo device comprising a flow passage with a fixed area orifice and a variable area orifice therein, means to pass fluid through said passage to establish a first reference pressure upstream of said orifices and a second reference pressure between said orifices, a servo unit actuated by said second reference pressure and adapted to vary the area of said variable area orifice, and a flow regulating valve communicating with said first and second reference pressures and having preselected end areas to establish the desired ratio between said reference pressures and communicating with and controlling the admission of a high pressure source into said passage for added sensitivity.

3. A servo device comprising a flow passage with a fixed area orifice and a variable area orifice therein, means to pass fluid through said passage to establish a first reference pressure upstream of said orifices and a second reference pressure between said orifices, a servo unit actuated by said second reference pressure and adapted to vary the area of said variable area orifice, and a flow regulating valve positioned by said first and second reference pressure and having preselected end areas to establish the desired ratio between said reference pressures and said end areas being of such size that said flow regulating valve will move to end travel to accelerate servo repositioning of said variable area orifice in response to reference pressure changes caused by variable area valve movement.

4. A servo device comprising a flow passage with a fixed area orifice and a variable area orifice therein, means to pass fluid through said passage to establish a first reference pressure upstream of said orifices and a second reference pressure between said orifices, a servo unit actuated by said second reference pressure and adapted to vary the area of said variable area orifice, and an unbiased flow regulating valve located to regulate the flow of fluid into said passage and having preselected end areas each communicating with a reference pressure to establish the desired pressure ratio therebetween, said areas being of such size that said valve will move to end travel in response to deviation from said desired pressure ratio caused by variable area orifice movement to effect maximum servo actuating pressure change to accelerate servo correction of said pressure ratio deviation by repositioning said variable area orifice.

5. Apparatus for increasing the sensitivity of a variable area flapper valve system comprising a fluid flow passage having a fixed area orifice upstream of said flapper valve to form a double flow restriction therewith, a flow regulating valve comprising a floating piston in said passage and located on the opposite side of said fixed area orifice from said flapper valve, a high pressure source from which fluid is directed through said regulating valve and flow passage to establish a first reference pressure between said regulating valve and said fixed area orifice and a second reference pressure between said fixed area orifice and said flapper valve, servo means actuatable by said second reference pressure connected to said flapper valve to reposition same with servo movement, means to introduce one of said reference pressures to one side of said piston and the other reference pressure to the other side of said piston, said piston having end surfaces of preselected areas to establish a desired pressure ratio between said reference pressures proportionate to piston end surface area ratio for fluid passage steady state flow so that said piston is positioned in intermediate positions by said reference pressures to maintain said desired pressure ratio during steady state flow and so that said piston is moved to end position when flapper valve movement causes pressure ratio deviation to effect maximum servo actuating pressure change to accelerate servo correction of said pressure ratio deviation by repositioning said flapper valve to re-establish steady state flow.

6. A servo device comprising a flow passage with a fixed area orifice and a variable area orifice therein, a free floating piston flow regulating valve positioned upstream of said orifices, means to pass fluid through said valve and passage to establish a first reference pressure upstream of said orifices and a second reference pressure between said orifices, a servo unit actuated by said second reference pressure and adapted to vary the area of said variable area orifice, said valve communicating with and positioned by said first and second reference pressures and having preselected end areas to establish the desired ratio between said reference pressures and communicating with and adapted to rapidly control the admission of said high pressure source into said passage to accelerate servo correction of said variable area orifice for added sensitivity to re-establish steady state flow and said desired reference pressure ratio.

7. A servo device comprising a flow passage with a fixed area orifice and a variable area orifice comprising pivotable flapper valve therein, a free floating piston flow regulating valve positioned upstream of said orifices, means to pass fluid through said valve and passage to establish a high pressure source upstream of said valve, a first reference pressure upstream of said orifices and a second reference pressure between said orifices, a servo output unit actuated by said second reference pressure and adapted to vary the area of said variable area orifice, said valve communicating with and positioned by said first and second reference pressures and having preselected end areas to establish the desired ratio between said reference pressures and communicating with and adapted to rapidly control the admission of said high pressure source into said passage to accelerate servo correction of said variable area orifice for add sensitivity to reestablish said steady state flow and said desired reference pressure ratio, and error sensing input means positioning the pivot of said pivotable flapper valve.

8. A servo device comprising a flow passage with two orifices of variable total area therein, means to pass fluid through said passage to establish a first reference pressure upstream of said orifices and a second reference pressure between said orifices, a servo unit actuated by said second reference pressure and adapted to vary the total area of said orifices, and means to maintain said total area constant during steady state operation.

9. A servo device comprising a flow passage with a fixed area orifice and a variable area orifice therein, means including a source of supply pressure to pass fluid through said passage to establish a first reference pressure upstream of said orifices and a second reference pressure between said orifices, a servo output unit actuated by said second reference pressure and adapted to vary the area of said variable area orifice, means to maintain said variable area orifice at a fixed are during all steady state operating condition and to maintain said first and second reference pressures constant during each steady state operation so that said output unit is unaffected by variations in said supply pressure.

10. A servo device comprising a flow passage with a fixed area orifice and a variable area orifice therein, means including a source of supply pressure to pass fluid through said passage to establish a first reference pressure upstream of said orifices and a second reference pressure between said orifices, a servo output unit actuated by said second reference pressure and adapted to vary the area of said variable area orifice, input means to vary the area of said variable area orifice, means to maintain said variable area orifice at a fixed area during all steady state operating conditions and to maintain said first and second reference pressures constant during each steady state operation so that said output unit is unaffected by variations in said supply pressure and reflects input means variations only.

References Cited in the file of this patent
UNITED STATES PATENTS

| | | |
|---|---|---|
| 2,085,303 | Ernst | June 29, 1937 |
| 2,146,537 | Farnham | Feb. 7, 1939 |
| 2,255,787 | Vlenduck | Sept. 16, 1941 |
| 2,272,684 | Vickers | Feb. 10, 1942 |
| 2,367,009 | Davis | Jan. 9, 1945 |
| 2,596,366 | Brockett | May 13, 1952 |
| 2,712,321 | Grogan | July 5, 1955 |
| 2,767,725 | Long | Oct. 23, 1956 |
| 2,789,543 | Popowsky | Apr. 23, 1957 |
| 2,790,427 | Carson | Apr. 30, 1957 |
| 2,838,028 | Erbguth | June 10, 1957 |
| 2,802,456 | Lance | Aug. 13, 1957 |
| 2,915,078 | Ochs | Dec. 1, 1959 |

FOREIGN PATENTS

| | | |
|---|---|---|
| 680,141 | Germany | July 27, 1939 |
| 643,170 | Great Britain | Sept. 15, 1950 |
| 669,308 | Great Britain | Apr. 2, 1952 |
| 492,783 | Canada | May 12, 1953 |